United States Patent Office 3,412,791
Patented Nov. 26, 1968

3,412,791
VISCOSITY CONTROL BY REGULATED WATER
CONTENT IN SOLUBLE OIL FLOODING
William B. Gogarty, Littleton, Colo., assignor to Marathon Oil Company, Findlay, Ohio, a corporation of Ohio
No Drawing. Filed May 25, 1967, Ser. No. 641,109
18 Claims. (Cl. 166—9)

ABSTRACT OF THE DISCLOSURE

The leading and trailing edges of a bank of micellar dispersion used in secondary-type oil recovery is of a reduced viscosity and water content if these edges of the bank are to contact water which will be taken up by the injected micellar dispersion. When water combines with these edges of the bank, the viscosity of the edges is increased to about that of the adjacent micellar dispersion so that mobility can be improved.

BACKGROUND OF THE INVENTION

This invention relates to the recovery of fluid hydrocarbons from subterranean formations by injecting into a formation a slug of soluble oil of modulated viscosity, driving the slug through the formation with a drive fluid, and recovering the displaced oil from the formation.

Ideally, a flood material used in oil recovery should be miscible with the oil in the formation and should have a viscosity at least as great as that of the petroleum fluids to be recovered. It should also be inexpensive. This latter requisite has been the rock on which most flooding materials have floundered. As a compromise, those skilled in the art have suggested the use of a slug of material miscible with the crude followed by a slug of material miscible with the first injected slug and with water. Water is used to drive the dual-slug bank through the formation.

The bank should also be gradually tapered in viscosity from that of the crude at the leading edge of the first slug of the bank to that of water at the trailing edge of the second slug.

Petroleum may be recovered from subterranean formations by injecting a slug of soluble oil into the formation and driving the soluble oil slug through the formation with water. The soluble oil is compatible with petroleum and achieves an almost perfect recovery of oil from the portions of a formation swept. "Compatible" as used herein is synonymous with "miscible" except that the internal phase is substantially immiscible with the substance the external phase is designed to contact. This procedure is more fully described in copending United States Patent application Ser. No. 212,134 filed on July 24, 1962, and now abandoned.

The soluble oils used in petroleum recovery to date have used an alkylaryl naphthenic monosulfonate surfactant. The addition of water to these soluble oils increases their apparent viscosity. Apparent viscosity is defined as the ratio of shear stress to rate of shear, the shear stress exhibited by the liquid being the result of the particular rate of shear. If this viscosity increase is not compensated for, the viscosity profile will show unwanted peaks, which increase required pumping pressures and otherwise reduce the efficiency of the flooding production.

It is the objective of this invention to ameliorate or nullify increases in viscosity caused by water sorption in subterranean formations. The sorption of water occurs in formations containing appreciable amounts of water; for example, in a tertiary flood undertaken after completion of a water flood. In such a situation, the leading edge of the slug of soluble oil as well as the trailing edge of the slug will contact large volumes of water and will tend to take up some of this water. The slug would also take up water from a slug of water-external emulsion which might be injected after the soluble oil to form a bank, of two slugs, which would be compatible at both the leading and trailing edges of the bank.

Summary of the invention

The process of this invention comprises injecting into a subterranean formation a series of slugs of soluble oil, the slug or slugs of soluble oil which are to contact large amounts of water being of a viscosity lower than that of the remaining slug or slugs due to a reduced water content. When water is mixed in these low-viscosity slugs, the viscosity of the contacted slugs rises to about that of the higher viscosity slugs which have not been in contact with appreciable amounts of water. The result of this procedure is to provide a method of maintaining a desired viscosity profile throughout a soluble oil bank.

Description of the preferred embodiments

The term "soluble oil," as used herein, is meant to define micellar dispersions, micellar solutions, microemulsions, and "transparent" emulsions. Soluble oil includes mixtures of nonpolar compounds, such as hydrocarbons, and one or more surfactants. It also includes the nonturbid oil-external dispersions containing water which are prepared from the soluble oils of commerce wherein the average diameter of the internal phase is less than the wave length of light and which form turbid emulsions on addition of water.

Viscosity control within the soluble oil bank can be achieved in a number of ways. Thus, in a tertiary recovery in a formation containing 50–60% water, a slug of soluble oil having a low water content would initially be injected; a second soluble oil slug containing a larger amount of water would be injected next; and a thickened flood material utilized to drive the soluble oil slugs through the formation. Alternately, if a water-external emulsion or water per se were to follow the soluble oil bank, a third slug of soluble oil would be injected. This last slug would also contain a reduced amount of water. Except for differences in water content, the slugs would have the same composition.

In the last alternative process, the water from the water-external emulsion or from the water drive would mix into the low-viscosity soluble oil bringing it up to about that of its adjacent fluids.

The soluble oils to which the process of this invention is applicable are preferably the soluble oils made up of hydrocarbon, water, and an alkylaryl naphthenic monosulfonate. Isopropanol, phenol, etc. can be utilized as a coupling agent if necessary. Other soluble oils can be prepared utilizing the surfactants set out in the aforementioned copending United States patent application Serial No. 212,134.

Normally, if the protective slugs, i.e., first and last slugs, have a reduced water content of 2–15%, and preferably 3–10%, a final uniform soluble oil viscosity in in the formation is more nearly insured. The reduced water content in the leading and trailing slugs will differ in formations having differing initial water contents and will differ according to the characteristics of the particular formation or soluble oil. Thus, in formations where there are large amounts of water and considerable mixing, the initial water content of the first injected slug will be considerably lower than that of the protected slug. Also, if differing hydrocarbons are utilized in the slugs, the original viscosity characteristics of each slug will be different, and, therefore, the amount of reduced water content will differ from that necessary where the hydrocarbon used in each slug is the same.

To select suitable soluble oil for use as slugs in a particular petroleum recovery, a series of soluble oil slugs are made up of different initial water concentrations. Additional water is mixed into each aliquot of soluble oil to obtain a viscosity equivalent to that of the crude to be recovered. These amounts are compared with the viscosity of the crude in the formation and the water content of the formation. Mixing rates within the formation can be determined from flooding cores from the formation to be flooded with soluble oil of various water content until the desired combination of slugs is determined.

Normally, each soluble oil slug of reduced viscosity need be only 5–10% of the total volume of soluble oil slugs. Larger or smaller portions can be of reduced viscosity if the situation so demands.

From about 1 to about 30% of the formation pore volume of soluble oil slugs is effective for oil recovery, but preferably 2–10% slug volume soluble oil is utilized.

The following example more fully illustrates this invention; however, it is not intended that the invention be limited to the particular slugs utilized, the particular hydrocarbons or surfactants. Rather, it is intended that all equivalents obvious to those skilled in the art be included within the scope of the invention as claimed.

Example I

Oil is recovered from a Pennsylvanian sand of the Illinois Basin at a depth of around 950 feet by the injection of 3 slugs of soluble oil followed by a water injection through the 4 injection wells of a regular five-spot pattern. The sand section is about 10 feet thickness, has a permeability of about 150 md., an oil saturation of about 35%, and a water saturation of about 65% of the pore volume. The crude viscosity is about 11 cp. Three soluble oil slugs were made up having volumes of 1,500 bbls; 12,500 bbls; and 1,500 bbls, respectively. The first and last slugs of the bank are made up of 25% water, 59.8% straight run gasoline, 3.8% isopropanol, and 11.4% of an oil-soluble alkylaryl naphthenic monosulfonate having an empirical formula approximating $C_nH_{2n-10}SO_3Na$, wherein $n$ is 25–30 and the alkyl radical contains from about 5 to about 20 carbon atoms. This surfactant can be purchased from Shell Chemical Company as a solution of 62% sulfonate in oil. This sulfonate is described in Shell Technical Bulletin S. C.: 60–47. These slugs have a viscosity of 5.5 cp. which rise to that of the oil in the formation when an additional 5% water is mixed into these slugs.

The large slug is made up of 30% water, 55.8% straight run gasoline, 3.5% isopropanol, and 10.7% sulfonate. The viscosity of this material is about 11 cp.

These slugs are injected into the formation at any convenient rate and preferably at a rate as to establish a frontal movement within the formation of about 2–4 feed/day. After the slugs have been injected into the formation, water is injected into the formation at the rate of about 60–150 bbls./day. Water injection is continued until economic recovery through the central well of the five-spot is no longer economical.

I claim:

1. The process for recovering petroleum hydrocarbon from hydrocarbon-bearing, subterranean formations comprising injecting into the formation, through at least one injection well, a plurality of slugs made up of soluble oils, at least one of said slugs located where the said at least one soluble oil slug and formation or drive water are in substantial contact containing less water and having a viscosity lower than the remainder of said plurality; thereafter, injecting at least one drive material into said formation to displace the hydrocarbon within the formation; and recovering fluid hydrocarbon from said formation through at least one production well drilled into said formation.

2. The process of claim 1 wherein the viscosity of the initial slug is lower than that of the other injected slug(s).

3. The process of claim 1 wherein the initial and last soluble oil slugs are of lower viscosity than that of the other injected slug(s).

4. The process comprising injecting into a subterranean hydrocarbon-bearing formation a low viscosity soluble oil slug having a low water content; injecting into said formation a soluble oil slug of relatively higher viscosity and water content, said viscosity being at least about as high as that of the viscosity of the crude in the formation; injecting an amount of water into the formation, through wells previously utilized for the injection of the soluble oil slugs, sufficient to displace hydrocarbons in the formation; and recovering fluid hydrocarbons from the formation through at least one recovery well drilled therein.

5. The process of claim 4 wherein, just prior to the injection of water, a low viscosity, low water content, with respect to the preceding slug, soluble oil slug is injected into the formation.

6. The process of claim 5 wherein a water-external emulsion is injected into the formation after the injection of the second low viscosity soluble oil slug and prior to the injection of water into the formation.

7. The process of claim 4 wherein the soluble oils are comprised of a hydrocarbon, water, and an alkylaryl napthenic monosulfonate.

8. The process of claim 4 wherein the reduced viscosity, low water content soluble oil contains from about 2 to 15%, by volume, less water than the high viscosity soluble oil.

9. The process of claim 4 wherein the reduced viscosity, low water content soluble oil contains from about 3 to 10%, by volume, less water than the high viscosity soluble oil.

10. The process comprising injecting into a crude hydrocarbon-bearing subterranean fomation, through at least one injection well drilled therein, a plurality of soluble oil, hydrocarbon external slugs of a hydrocarbon, water, and an alkylaryl napthenic monosulfonate, at least one of the slugs having a viscosity lower than the remainder of said plurality and said slug having a lower water content than the remainder of said plurality; thereafter, injecting at least one drive material into the formation to displace the crude hydrocarbon within the formation and recovering crude hydrocarbon from said formation through at least one production well drilled into said formation.

11. The process of claim 10 wherein the viscosity of the initial slug is lower than that of the other injected slug(s).

12. The process of claim 10 wherein the initial and last soluble oil slugs are of lower viscosity than that of the other injected slug(s).

13. The process of claim 10 wherein a water-external emulsion is injected into the formation after the injection of the soluble oil slugs and prior to the injection of a drive material and wherein the drive material is water.

14. The process comprising mixing hydrocarbons, water, and a surfactant to form soluble oil slugs of viscosities generally relating to the water content of the soluble oil; injecting into a subterranean formation bearing fluid hydrocarbons, through at least one injection well drilled therein, the soluble oil slugs in predetermined sequence so that slugs of soluble oil which contact substantial amounts of water are of a viscosity and water content lower than that of any of the remaining slugs; thereafter, injecting into the formation, through substantially the same wells, a drive material in amounts effective to displace the hydrocarbon in the formation toward at least one production well drilled into the formation; and producing fluid hydrocarbon from the formation.

15. The process of claim 14 wherein each of the low viscosity hydrocarbon slugs comprises 5–10% of the total volume of soluble oil slugs and wherein the total soluble oil slug volume comprises 1–30% of the pore volume of the subterranean formation.

16. The process of claim 14 wherein the total volume of soluble oil slugs comprises 2–10% of the pore volume of the subterranean formation.

17. The process of claim 14 wherein the reduced viscosity, low water content soluble oil contains from about 2 to 15%, by volume, less water than the high viscosity soluble oil.

18. The process of claim 14 wherein the reduced viscosity, low water content soluble oil contains from about 3 to 10%, by volume, less water than the high viscosity soluble oil.

References Cited

UNITED STATES PATENTS

| 2,867,277 | 1/1959 | Weinaug et al. | 166—9 |
| 3,254,714 | 6/1966 | Gogarty et al. | 166—9 |
| 3,261,399 | 7/1966 | Coppel | 166—9 |
| 3,266,570 | 8/1966 | Gogarty | 166—9 |
| 3,275,075 | 9/1966 | Gogarty et al. | 166—9 |
| 3,297,084 | 1/1967 | Gogarty et al. | 166—9 |
| 3,297,085 | 1/1967 | Herring | 166—9 |
| 3,307,628 | 3/1967 | Sena | 166—9 |
| 3,330,343 | 7/1967 | Tosch et al. | 166—9 |
| 3,348,611 | 10/1967 | Reisberg | 166—9 |

STEPHEN J. NOVOSAD, *Primary Examiner.*